United States Patent
Ficht et al.

(10) Patent No.: US 10,071,441 B2
(45) Date of Patent: Sep. 11, 2018

(54) METHOD FOR PRODUCING A HOLLOW BODY WHICH IS PRESSURE-TIGHT TO A PREDETERMINED MEDIUM

(71) Applicant: Bertwin R. Geist Immobilien + Erneuerbare Energien e.K., Eurasburg (DE)

(72) Inventors: Reinhold Ficht, Kirchseeon (DE); Evangelos Adamidis, Grafing (DE); Tobias Steinbeißer, München (DE)

(73) Assignee: Bertwin R. Geist Immobilien + Erneuerbare Energien e.K., Eurasburg (DE)

(*) Notice: Subject to any disclaimer, the term of this patent is extended or adjusted under 35 U.S.C. 154(b) by 515 days.

(21) Appl. No.: 14/646,005

(22) PCT Filed: Nov. 19, 2013

(86) PCT No.: PCT/EP2013/074180
§ 371 (c)(1),
(2) Date: May 19, 2015

(87) PCT Pub. No.: WO2014/076305
PCT Pub. Date: May 22, 2014

(65) Prior Publication Data
US 2015/0298250 A1    Oct. 22, 2015

(30) Foreign Application Priority Data

Nov. 19, 2012 (DE) .................. 10 2012 111 136
Jan. 28, 2013 (DE) .................. 10 2013 100 830

(51) Int. Cl.
*F01P 3/12* (2006.01)
*B23K 20/12* (2006.01)
(Continued)

(52) U.S. Cl.
CPC .......... *B23K 20/129* (2013.01); *B23K 20/122* (2013.01); *B23K 31/02* (2013.01);
(Continued)

(58) Field of Classification Search
CPC ........... Y10T 29/49288; Y10T 29/4929; Y10T 29/49913; B23P 15/00; B23P 2700/04;
(Continued)

(56) References Cited

U.S. PATENT DOCUMENTS 2,671,953 A * 3/1954 Balke .................... B22F 3/1134
                                                                29/423
3,201,858 A * 8/1965 Valyi .................... B01D 25/001
                                                                165/907

(Continued)

FOREIGN PATENT DOCUMENTS

CH       202301 A * 1/1939 ........... F02B 75/002
DE     1922748 A1   11/1970
(Continued)

OTHER PUBLICATIONS

English Translation of Gazda CH 202301 A.*
Averseng FR 933508 English Translation Lutz DE 4405091 English Translation.*

*Primary Examiner* — Jason L Vaughan
*Assistant Examiner* — Amanda Meneghini

(57) ABSTRACT

A method for producing a hollow body that is pressure-tight for a predetermined medium through the joining of at least two sub-bodies, which when joined form the hollow body that contains the medium in a gaseous and/or liquid state during the intended use of the hollow body; the at least two sub-bodies are integrally joined by means of an integral joining method that can be successfully performed at ambient pressure; the medium is introduced into at least one sub-cavity of at least one sub-body in a solid or partially solid state before the integral joining is performed, the
(Continued)

medium is introduced together with a container element that contains or holds the medium in a solid or partially solid state, from which containing element the medium can escape in the liquid or gaseous state; and then the integral joining is carried out.

17 Claims, 8 Drawing Sheets

(51) Int. Cl.
  *F01B 9/02* (2006.01)
  *F28D 15/02* (2006.01)
  *F01B 1/08* (2006.01)
  *F02B 75/24* (2006.01)
  *F02B 75/28* (2006.01)
  *B23K 31/02* (2006.01)
  *B23P 15/26* (2006.01)
  *F16C 7/02* (2006.01)
  *F01P 3/22* (2006.01)

(52) U.S. Cl.
  CPC ............... *B23P 15/26* (2013.01); *F01B 1/08* (2013.01); *F01B 9/023* (2013.01); *F01B 9/026* (2013.01); *F01P 3/12* (2013.01); *F02B 75/24* (2013.01); *F02B 75/28* (2013.01); *F16C 7/023* (2013.01); *F28D 15/0283* (2013.01); *F01P 2003/2278* (2013.01); *F28F 2275/06* (2013.01); *F28F 2275/062* (2013.01)

(58) Field of Classification Search
  CPC ............... F02F 3/18; F02F 2003/0061; F02F 2003/0038; F02F 2003/0053
  See application file for complete search history.

(56) References Cited

U.S. PATENT DOCUMENTS

| | | | |
|---|---|---|---|
| 3,797,086 A | 3/1974 | Asselman | |
| 4,413,392 A * | 11/1983 | Otani | B23P 15/00 219/119 |
| 5,222,772 A * | 6/1993 | McGraw | F16B 7/0426 285/243 |
| 7,854,131 B2 * | 12/2010 | Ullman | F28D 20/021 62/530 |
| 2006/0186125 A1 * | 8/2006 | Tew | A47J 41/022 220/592.27 |
| 2008/0006793 A1 | 1/2008 | Hirnschal | |
| 2011/0083829 A1 | 4/2011 | Hung et al. | |
| 2012/0011720 A1 * | 1/2012 | Lin | F28D 15/0283 29/890.032 |

FOREIGN PATENT DOCUMENTS

| | | | | |
|---|---|---|---|---|
| DE | 2255363 | | 6/1973 | |
| DE | 2324850 A1 | | 12/1974 | |
| DE | 2943731 A1 | | 5/1981 | |
| DE | 1405091 A1 | | 8/1995 | |
| DE | 4405091 A1 | | 8/1995 | |
| DE | 102005005041 A1 | | 8/2006 | |
| DE | 102007063096 A1 | | 7/2009 | |
| FR | 933508 A | * | 4/1948 | ............... F02F 3/18 |
| GB | 1270206 A | * | 4/1972 | ........... B23K 20/129 |
| JP | 2005048635 A | | 2/2005 | |

* cited by examiner

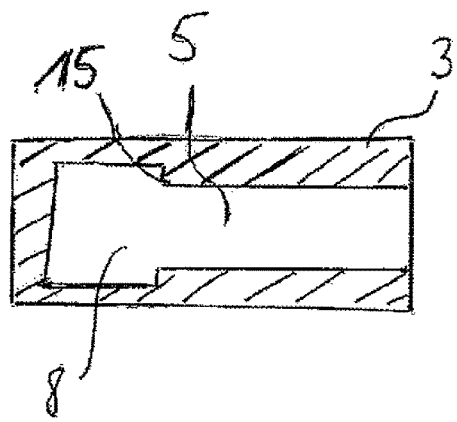
Fig. 4
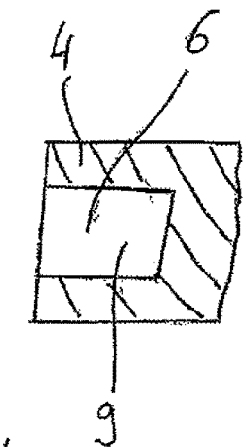
Fig. 5 (left image shows Fig.5 labeled 3, 5, 8)
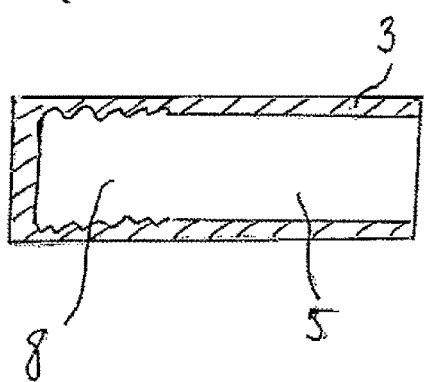
Fig. 5
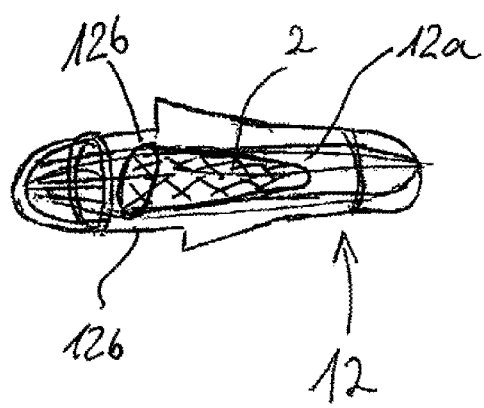
Fig. 6
Fig. 7

METHOD FOR PRODUCING A HOLLOW BODY WHICH IS PRESSURE-TIGHT TO A PREDETERMINED MEDIUM

FIELD OF THE INVENTION

The present invention relates to a method for producing a hollow body that is pressure-tight for a predetermined medium and also relates to a piston rod.

BACKGROUND OF THE INVENTION

Hollow bodies that are pressure-tight for a predetermined medium, which is contained in the hollow interior of the hollow body during its intended use, can be provided for a variety of applications. One possible application is the use of the hollow body as a heat pipe. In this application, the medium is moved back and forth between a hot end and a cold end of the heat pipe due to a movement of the heat pipe; it absorbs heat at the hot end and gives off this heat at the cold end. This permits a dissipation of heat from the hot end.

This application is known, for example, from DE 44 05 091 A1. In that case, a hollow body embodied in the form of a heat pipe is used as a piston rod of a Scotch yoke motor. In it, the piston rod connects the piston to the Scotch yoke. The liquid contained in the piston rod, which can be water for example, absorbs heat at the piston end of the piston rod, evaporates as a result, and is then moved in the direction of the Scotch yoke by the movement of the Scotch yoke and thus of the piston rod. This end of the piston rod is cooler or can actually be cooled so that the liquid condenses there and thus gives off heat. The piston rod is integrally connected to the Scotch yoke. The piston is screwed to a plug that is inserted into the open end of the piston rod, after the liquid has been introduced into the piston rod. Such a screw connection, however, can become leaky due to the high stresses that occur in a Scotch yoke motor. This is further exacerbated by the fact that the rapid back and forth movements cause vibrations to occur, as a result of which the screw connection can gradually come loose and needs to be retightened at particular intervals. Also the plug seal itself can become leaky due to the vibrations and the associated wear.

Another application for a hollow body that is pressure-tight for a predetermined medium is the use as a valve for a reciprocating piston internal combustion engine. Such a valve is known from DE 2 324 850. In the method described therein, the valve shaft is welded to the valve disc part in a gas-tight fashion. Then a heat transfer liquid, in particular sodium, is placed into an inner cavity of the valve shaft in a liquid state. The heat transfer liquid must then be cooled so that it assumes the solid aggregation state. After a laborious cleaning, the valve-closing part is inserted from the end into the inner cavity of the valve shaft and then fastened to the valve shaft by means of electron beam welding. The above-described method is very labor-intensive since it requires many method steps and during production, it requires multiple heating with subsequent selective cooling.

DE 19 22 748 has disclosed a method and device for filling a heat pipe. As a disadvantageous option when producing a heat pipe, it discloses freezing the working liquid, evacuating the heat pipe, i.e. providing it with a vacuum, and then welding it by means of electron beam welding. With regard to the freezing, it is considered to be disadvantageous that frost can form on the circumferential surface of the heat pipe, which interferes with the electron beam welding machine. This publication therefore assumes that the welding process is electron beam welding, which makes it necessary to act on the interior of the heat pipe with vacuum since electron beam welding takes place in a vacuum. The freezing of the working liquid therefore serves to hinder a volatilization, i.e. an evaporation of the working liquid under vacuum.

The above-mentioned publication also proposes initially placing the working liquid in an ampule and then inserting the ampule into the cavity before the heat pipe is welded shut. After the heat pipe is closed, the ampule must be destroyed in order to release the working liquid. It also proposes embodying the ampule out of glass or plastic.

In this method, it is disadvantageous that the ampule must be embodied as relatively stable so that it does not break during production of the vacuum for the electron beam welding. With a relatively stable and solidly embodied ampule, it is not always possible to ensure that it will be reliably possible to destroy it after the closing of the heat pipe. Particularly with an ampule made of glass, it is disadvantageous that after the ampule is destroyed, glass splinters remain in the cavity and may possibly damage an inner surface of the cavity. For a heat pipe that is used as a piston rod of a reciprocating piston engine, it is not acceptable to leave glass splinters inside the piston rod.

The object of the invention, therefore, is to provide an easy-to-perform method for producing a hollow body that is pressure-tight for a predetermined medium in which the medium is prevented from escaping from the cavity of the hollow body during production.

Another object of the invention is to more economically embody known methods for producing a hollow body that is pressure-tight for a predetermined medium and to make them easier to perform.

Another object of the invention is to provide a method for producing a hollow body that is pressure-tight for a predetermined medium in which it is also possible for highly volatile and in particular nonmetallic mediums to be used as the predetermined medium.

Another object of the invention is to provide a piston rod with a hollow body that is pressure-tight for a predetermined medium, which is easy to produce.

Another object of the invention is to provide a piston rod with a hollow body that is pressure-tight for a predetermined medium, in which a sufficient quantity of medium is present in the hollow body.

SUMMARY OF THE INVENTION

In a first alternative of the method according to the invention for producing a hollow body that is pressure-tight for a predetermined medium, at least two sub-bodies are joined. When joined, the at least two sub-bodies form the hollow body that contains the medium in a gaseous and/or liquid state during the intended use of the hollow body. For example, this enables the use as a heat pipe in which the medium is evaporated at a hot end and condensed at a cooler end. The at least two sub-bodies in this case are integrally joined by means of an integral joining method that can be successfully performed at ambient pressure. In this case, before the integral joining, the medium is placed into at least one sub-cavity of at least one of the sub-bodies in a solid or partially solid state; the medium (2) is introduced together with a container element (12) that contains or holds the medium (2) in a solid or partially solid state, from which containing element the medium (2) can escape in the liquid or gaseous state. Then the integral joining is carried out. This ensures that the medium cannot escape from the sub-cavity as the integral joining is being performed and in particular, also cannot penetrate into and contaminate the integral joining connection. Such a contamination could, for example, cause the connection to become brittle or even fail.

The method according to the invention can be carried out by means of an inexpensive integral joining method that can be carried out with simple equipment, e.g. a welding method, in particular a friction welding method. Because the medium is introduced together with a container element that contains or holds the medium in a solid or partially solid state, for example heat that is introduced into the sub-bodies or the single body during the integral joining process cannot be imparted too quickly to the medium in the solid or partially solid state, which would cause the latter to volatilize or evaporate before the cavity is closed. The container element thus functions as an insulator between an inner wall of one of the sub-bodies or the single body and the medium that is introduced in a solid or partially solid state. This also makes it possible to introduce the medium, together with the container element, into one of the sub-bodies or into the single body before the joining, without requiring cooling of the relevant sub-body or body. This reliably prevents a formation of frost, which can possibly interfere with the subsequent integral joining process. This possibility therefore reduces the amount of effort to prepare the sub-bodies that are to be joined or the body that is to be closed, which is required before the production of the hollow body. In particular, the container element also permits the medium to be transported to a predetermined location in the cavity or sub-cavity and then to also be advantageously immobilized there, e.g. by clamping, at least for a certain amount of time. This additional holding also ensures that during the production process, the medium does not penetrate into the region in which the joining process or the sealing is to be carried out.

In this case, it is not absolutely necessary for the medium to be entirely in the solid aggregation state, but this is preferable. The medium can, for example, also be in the form of a gel. The crucial factor is that the medium has a sufficient rigidity or inertia in the state in which it is used, which prevents it from escaping during the integral joining. According to the invention, it is particularly prevented from escaping even if, for example in the case of a piston rod, two essentially hollow cylindrical sub-bodies, which are each closed at one end, are joined by means of the method according to the invention, with these sub-bodies lying in a horizontal position. In this case, if the medium were introduced into the sub-bodies in a liquid state or in a gaseous state, then it could easily escape. The method according to the invention prevents this.

In an alternative embodiment of the method according to the invention, a single body is integrally sealed by means of an integral joining method that can be successfully performed at ambient pressure. This body then constitutes the hollow body that is pressure-tight relative to the predetermined medium. This hollow body contains the medium in a gaseous and/or liquid state during the intended use. In this alternative as well, the medium is introduced in a solid or partially solid state before the body is integrally sealed; the medium (2) is inserted together with a container element (12), which contains or holds the medium (2) in a solid or partially solid state and from which the medium (2) can escape in the liquid or gaseous state. Only then is the body integrally sealed. The advantages thus achieved correspond to those of the first alternative. An escape of the medium during production is effectively prevented in this alternative as well.

In an advantageous modification of the method according to the invention, the sub-bodies according to the first alternative of the method according to the invention are integrally joined through the application of heat or in the case of the second alternative of the method according to the invention, the body is integrally sealed through the application of heat. The expression "application of heat" is understood to include both methods in which heat from a heat source is actively introduced into the sub-bodies or body and methods in which the heat is produced as the method is being carried out, particularly in the bodies that are to be joined or the body that is to be sealed, as is the case in a friction welding method, for example. Joining or sealing through the application of heat has turned out to be particularly advantageous since this permits a pressure-tight sealing of the hollow body in a simple and reliable fashion.

In an advantageous modification of the method according to the invention, in the case of the first alternative of the method according to the invention, the sub-bodies are integrally joined through deformation and/or the addition of material and in the case of the second alternative of the method according to the invention, the body is integrally sealed through deformation and/or the addition of material. This permits a reliable and economical joining or sealing of the hollow body. For example, a tubular body that is open at only one end, after the medium has been introduced, can be deformed at the open end so that this end is integrally sealed. It would thus be possible to produce a pressure-tight hollow body in only a single process step. In this alternative, the medium is introduced into the cavity of the body in a solid or liquid state before the deforming step.

In the case in which the two sub-bodies are friction welded to each other, the hollow body would actually be produced through the application of heat and deformation. The friction welding method is particularly preferable; basically, a welding method is considered to be preferable for the integral joining or sealing. A likewise preferred method is friction stir welding since this method also permits a secure connection in the sense of an integral joining or sealing. In the broadest sense, all integral joining methods that can be successfully performed at ambient pressure are suitable for the method according to the invention. In addition to the welding methods described above, possible suitable welding methods also include resistance welding, laser welding, gas-shielded welding, inert gas welding, and oxyacetylene welding. Furthermore, suitable integral joining methods also include glued connections produced by means of adhesives that must in particular be selected by specialists as a function of the temperature and pressure conditions in the hollow body that occur during operation. In the case of hollow bodies that are made of plastic, it is also possible to use welding methods that are suitable for welding plastics. In particular, these include ultrasonic welding, vibration welding, and fusion welding.

In an advantageous modification of the method according to the invention, the medium that is contained in the hollow body during its intended use is water and/or Diphyl® heat transfer fluids, available from Lanxess Corporation, and/or perchloroethylene and/or trichloroethylene. In this case, the medium can either be composed of one of these substances or of a mixture of these substances. According to the invention, these substances have turned out to be effective mediums for a heat transfer from one end of a heat pipe to another end of the heat pipe. If water is used, then in the method according to the invention, it is advantageously introduced into the cavity or a sub-cavity in the form of ice.

Remarkably, it has turned out that even with an integral joining or sealing of the hollow body through the application of heat, for example in a welding method, despite the application of heat to the sub-bodies or body, a volume of ice in the container element melts slowly enough to prevent an escape of water or water vapor during the process. Since friction welding takes only a small amount of time to perform, such a method has turned out to be particularly advantageous since with this method, the medium does not have enough time to melt or evaporate, thus effectively preventing the medium from escaping.

The container element in this case advantageously has a sleeve-like, spherical, or rotationally elliptical three-dimensional form. In addition or alternatively, the container element is advantageously embodied in a grid-like and/or net-like form. This embodiment ensures that when in a solid or partially solid state, the medium is held by the container element but when in the liquid or gaseous state, the medium is no longer held by the container element or is hardly held by it so that for example in an application in which it is used as a heat pipe, the medium is able to flow freely and/or to slosh back and forth.

In order to also ensure that the container element and the medium contained therein does not travel into the region of the integral sealing or joining, an advantageous modification includes the provision that the container element is inserted in a resiliently prestressed fashion, particularly so that it is prestressed in a radial direction. If the body or a sub-body is embodied in the form of a tubular component, then the container element is or can be advantageously prestressed in the radial direction so that it can be inserted into the cavity or sub-cavity and then due to the radial clamping force that is exerted, is held against the inner wall of the body or sub-body securely enough for implementation of the method. This makes it more difficult for the container element to shift in the cavity or sub-cavity, which ensures that the medium does not travel into the region of the integral joining or integral sealing.

The piston rod according to the invention has a pressure-tight hollow body with a cavity-forming sub-body or a body that has a cavity. The hollow body is integrally sealed; sealed is a description that also applies to a hollow body composed of two or more joined sub-bodies. The cavity of the hollow body contains a medium that is liquid and/or gaseous during the intended use of the hollow body.

Unlike with the known piston rods, in the piston rod according to the invention, there is no danger of the piston coming loose from the piston rod due to vibratory movements. In addition, the tightness of the piston rod according to the invention is significantly better than in conventional piston rods, which have a medium in a cavity. The piston rod according to the invention can advantageously be produced using the method according to the invention in one of the embodiments described above. This permits an economical production of piston rods with a pressure-tight hollow body that contains a medium.

In an advantageous modification of the piston rod according to the invention, in at least one end region, the cavity has a retaining element for the medium and/or container element that contains the medium. During the production of the piston rod, this retaining element causes the medium—or more precisely, the container element—to remain in the end region, thus preventing it from traveling into the region in which the integral joining or integral sealing is performed. In the context of the method according to the invention, such a retaining element can also be provided in the cavity or a sub-cavity, particularly in a respective end region of the cavity or sub-cavity.

The retaining element is advantageously embodied in the form of an enlarged region of the cavity or sub-cavity and also advantageously has holding means, e.g. in the form of a retaining shoulder, a retaining collar, or a retaining cone. These elements enhance the retaining action of the retaining element, thus providing additional assurance that the medium remains in the end region during production.

In another advantageous modification of the piston rod according to the invention, the retaining element has a roughened surface region. This provides a greater resistance for the medium or the container element with regard to a movement away from the end region, which in turn hinders such a movement.

In an advantageous modification of the piston rod according to the invention, the cavity has a ribbed and/or laminar structure in at least one end region. This structure can, for example, be embodied in the form of a thread or in the form of longitudinal flutes or longitudinal fins. This ribbed or laminar structure can on the one hand likewise hinder or delay a movement of the medium or of the container element away from the end region. Another significant advantage of the ribbed or laminar structure, however, is that it enables an improved heat transfer between the medium and the hollow body since the ribbed or laminar structure provides the hollow body with a larger surface area for contact with the medium. This is true both for the transmission of heat to the medium at one end of the piston rod and for the transmission of heat from the medium at another end of the piston rod.

The use of the connecting rod according to the invention in a reciprocating piston engine, in particular a Scotch yoke motor, especially in order to embody piston rods of a Scotch yoke turns out to be particularly advantageous. In these applications, the piston rod according to the invention permits heat to be transferred from the piston; this piston rod is also less susceptible to wear and requires less maintenance than known piston rods with a heat dissipating function.

BRIEF DESCRIPTION OF THE DRAWINGS

The invention will be explained in greater detail below in conjunction with the drawings. In the drawings:

FIG. 4 shows another embodiment of a hollow body produced by means of the method according to the invention, at the beginning of the process.

FIG. 5 shows another embodiment of a hollow body produced by means of the method according to the invention, at the beginning of the process.

FIG. 6 shows a container element for use in the method according to the invention, with medium placed in it.

FIG. 7 shows another embodiment of a container element for the medium for use in the method according to the invention.

DETAILED DESCRIPTION OF THE PREFERRED EMBODIMENTS

Figure 1:
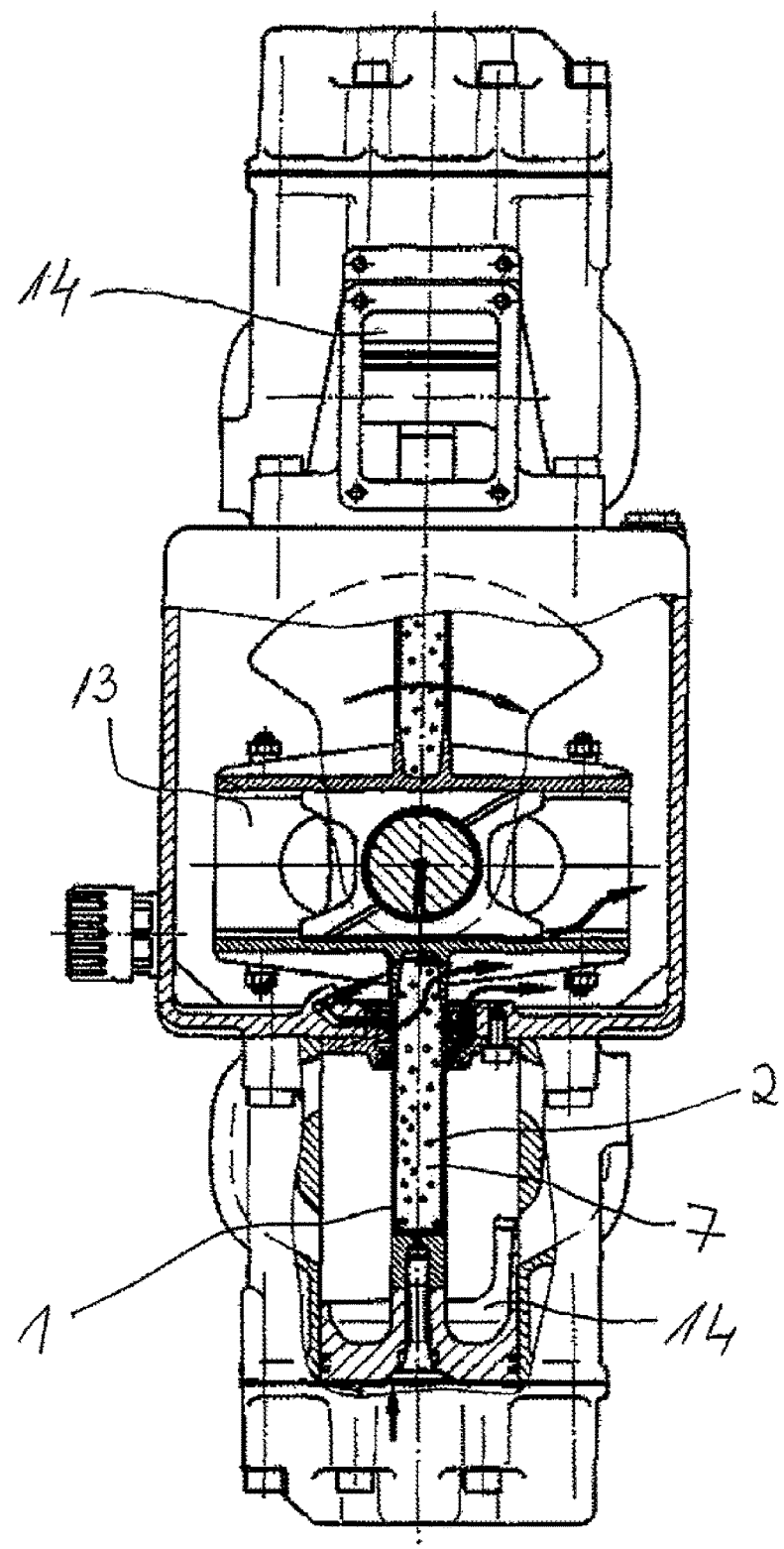
FIG. 1 shows a partially sectional top view of a Scotch yoke motor with piston rods according to the invention.

FIG. 1 shows a Scotch yoke motor with two working cylinders, each with a respective piston 14 traveling in it. Each of the pistons 14 is connected by means of a piston rod 1 according to the invention to a Scotch yoke 13 of the Scotch yoke motor. In FIG. 1, the bottom cylinder is at the top dead center and the top cylinder is at the bottom dead center of the cyclical action of the Scotch yoke motor.

During operation of the Scotch yoke motor, the pistons 14 move back and forth together with the piston rods 1 and the Scotch yoke 13, causing a medium 2 contained in the respective cavity 7 of the piston rods 1 to move back and forth. In executing this movement, the medium 2, which in this case is water, absorbs heat from the piston 14 and evaporates as a result. Then the movement of the combination of the Scotch yoke 13 with the piston rods 1 and the piston 14 causes the medium 2 to move in the direction of the Scotch yoke 13, where it transmits heat to the surroundings of the Scotch yoke 13. In order to improve the dissipation of heat, the Scotch yoke 13 can be cooled, for example, by means of an oil bath or oil jet. This process occurs in opposite directions in the two cylinders, i.e. while the medium 2 in the one piston rod 1 is being heated at the piston end of the piston rod 1, the medium 2 of the other piston rod 1 is transmitting heat to the surroundings of the Scotch yoke 13.

Figure 2:
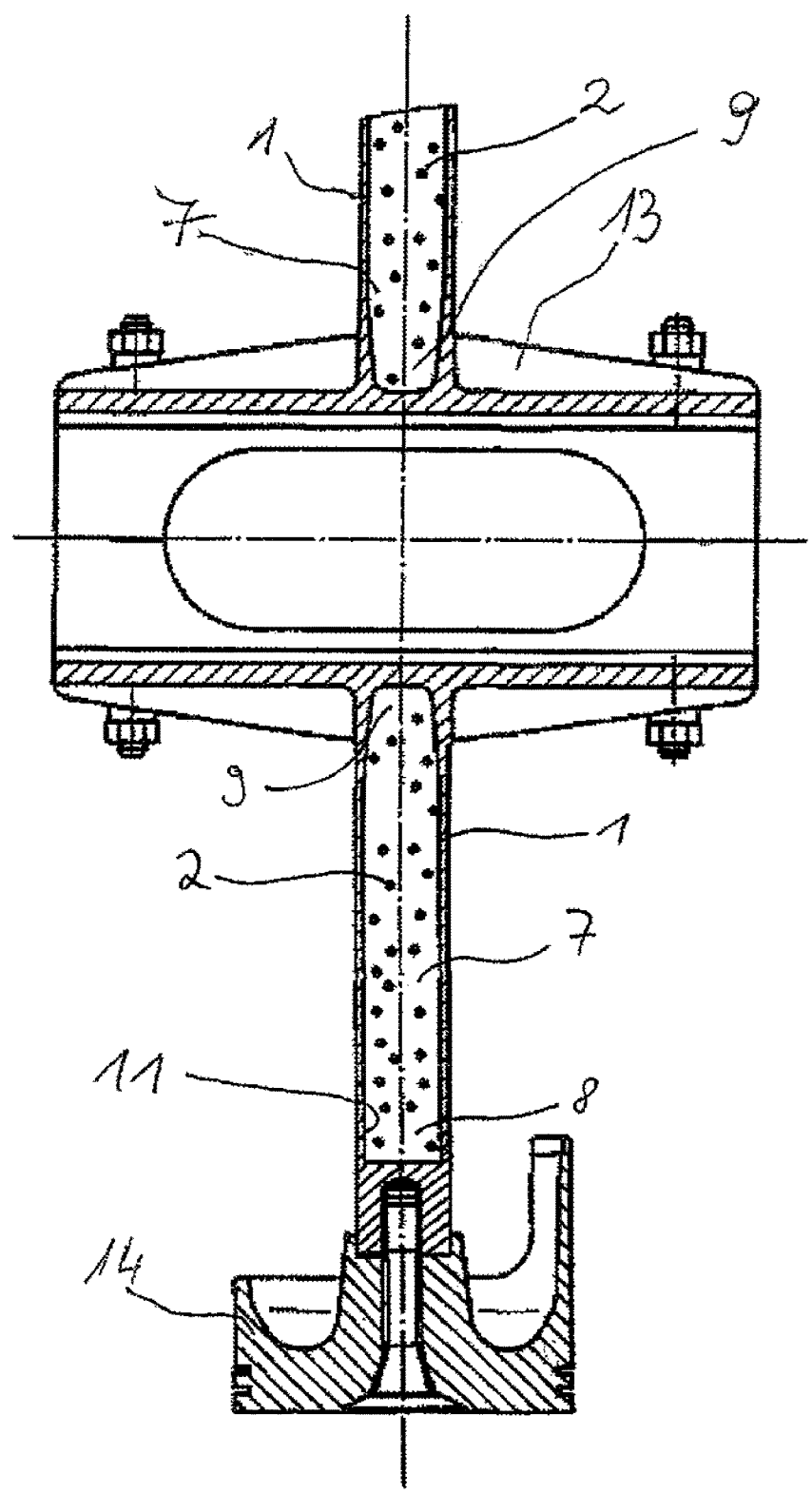
FIG. 2 shows a detail view of a combination of a Scotch yoke, a piston rod according to the invention, and a piston.

FIG. 2 provides a more detailed depiction of the structure of the combination of the Scotch yoke 13, piston rods 1, and also a piston 14 at one end. Only the lower half of the depicted combination will be discussed below since the upper half is embodied in the same way. The piston rod 1 has a cavity 7, which extends over a large part of the piston rod 1 in a longitudinal direction. A medium 2, in this case water, is contained in the cavity 7. Because of the operating temperatures of the Scotch yoke motor, the water is in liquid and/or gaseous form during the intended use of the piston rod. In particular, in one end region 8 of the piston rod 1, the medium 2 is heated by the heat that radiates from the piston 14 and the heat that is conducted via the piston rod 1 so that the medium 2 transitions into the gaseous aggregation state.

The subsequent movement of the combination of the Scotch yoke 13, the piston rods 1, and the pistons 14 causes the medium 2 to move into the other end region 9 of the piston rod 1 where the medium 2 transmits heat to the adjacent region of the piston rod 1 and to the Scotch yoke 13 and the surrounding region. Then the combination moves in the opposite direction, causing the medium 2 to move back into the end region 8, where it can absorb heat once again.

In the end region 8 of the piston rod 1, the wall of the cavity 7 is provided with a roughened surface region 11. During the production of the piston rod 1 according to the invention, this surface region 11 exerts a retaining action on the medium 2 that is in a solid or partially solid state, but does not hinder the flow of the medium 2 during the intended use. Instead, the surface region 11 improves the heat transmission between the piston end of the piston rod 1 and the medium 2 contained in the end region 8 since the roughening provides a larger surface area for the heat transmission.

Figure 3:
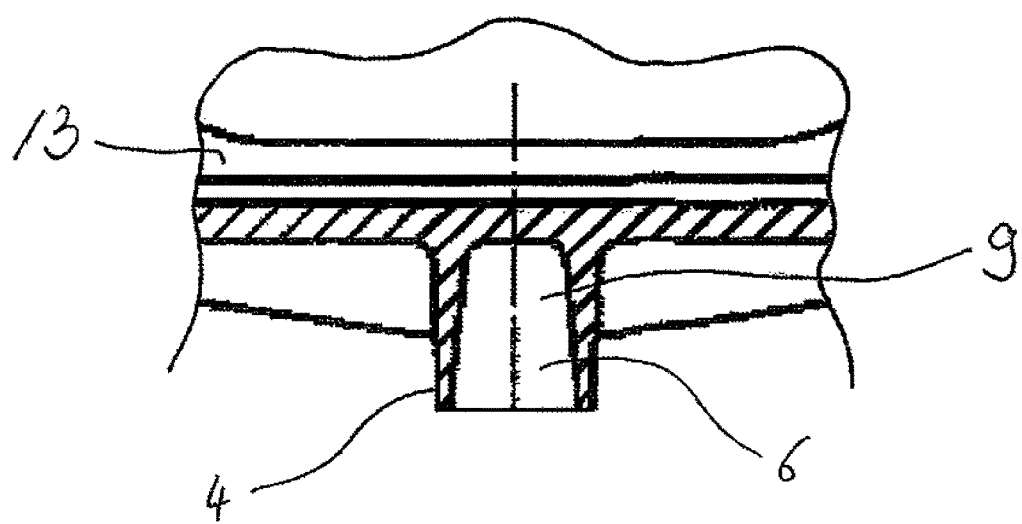
FIG. 3 shows the individual parts of a hollow body produced by means of the method according to the invention, which is embodied in the form of a piston rod, at the beginning of the process.
Figure 3:
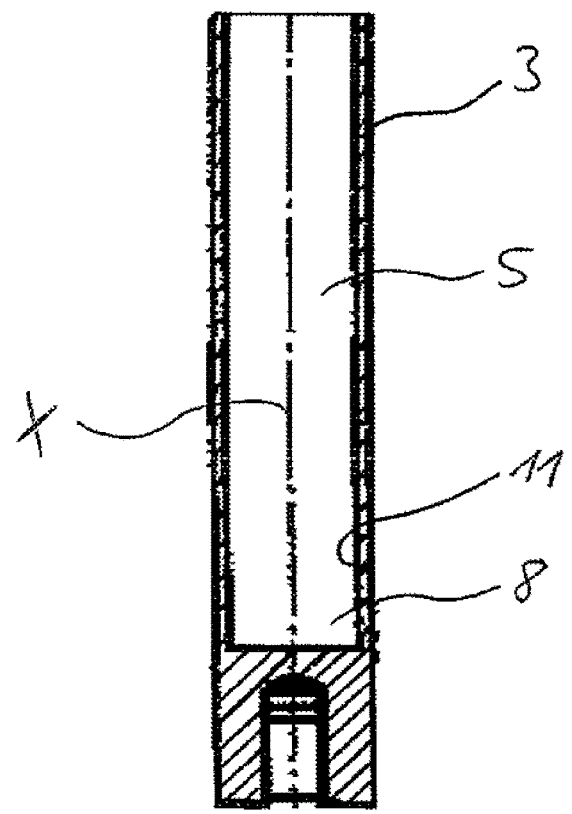

The piston rod 1 according to FIG. 2 was produced by means of the method according to the invention. At the beginning of the method according to the invention, there were two sub-bodies 3, 4, which each contained a respective sub-cavity 5, 6. These sub-bodies 3, 4 are shown in FIG. 3.

The sub-body 3 in this case has the sub-cavity 5 and the end region 8 that is provided, for example, with a roughened surface region 11. The second sub-body 4 is provided with the sub-cavity 6 and the end region 9. The sub-body 4 is produced so that it is of one piece with the Scotch yoke 13 and is essentially composed of a short, tubular body that is sealed at one end by a wall of the Scotch yoke 13.

The connection of the two sub-bodies 3, 4 is carried out as follows in the method according to the invention:

First, the medium 2 is introduced into the sub-cavity 5 of the sub-body 3 in a solid or partially solid state, for example in the form of an icicle, together with and held by a container element 12. Then the sub-body is set into rotation around its longitudinal axis X and is moved from the position shown in FIG. 3 toward the sub-body 4. The sub-bodies 3, 4 are friction welded to each other by the heat that is generated during the contact of the sub-bodies 3, 4 and by a pressing power of the sub-bodies 3, 4 against each other. Until the time at which the friction welding is complete, the medium 2 has not yet melted so that during the entire production process, the medium has remained in the end region 8 and therefore cannot escape from the cavity 7 produced or from the sub-cavities 5, 6.

The sub-body 3 is provided with a threaded bore at its piston end to which the piston 14 can be fastened. Whereas in the prior art, a stopper was used for connecting the piston rod to the piston, the piston rod according to the invention can be directly connected to the piston by means of a screw connection. As are result, this connection lasts significantly longer than the connection that is known from the prior art. By means of the integral connection of the two sub-bodies 3, 4, the hollow body 1 produced—or more precisely, the piston rod 1—is pressure-tight relative to the medium 2, which prevents the medium 2 from escaping from the cavity 7.

FIG. 4 shows another embodiment of two sub-bodies 3, 4 with their sub-cavities 5, 6. In the end region 8 of the sub-body 3, a retaining element for the container element 12 of the medium 2 is provided, which is embodied in the form of an enlarged region of the cavity 7. If in the production of the pressure-tight hollow body 1 according to the invention, the medium 2 is inserted into the sub-cavity 5 of the sub-body 3 together with the container element 12, then the container element 12 can come to rest in the enlarged region in the end region 8. The holding means 15 embodied in the form of a retaining collar prevents the container element 12 from traveling together with the medium 2 from the end region 8 into a front region of the sub-body 3 in an unwanted fashion. This ensures that the medium 2 cannot escape from the sub-cavity 5, melt, or partially melt in an undesirable fashion during the subsequent friction welding process.

FIG. 5 shows another embodiment of the sub-bodies 3, 4 at the beginning of the method according to the invention. The sub-body 4 in this case does not have a cavity. Consequently, the subsequent cavity 7 of the hollow body 1 is formed by the sub-cavity 5 of the sub-body 3. In the end region 8 of the sub-cavity 5, a ribbed structure on the inner wall of the sub-body 3 is provided, which is embodied in the form of a thread located there. This ribbed structure increases the surface area with which the medium 2 contacts the sub-body 3 during the intended use of the hollow body 1, thus improving the heat transmission between the medium 2 and the sub-body 3. These features that are described in connection with the sub-body 3 according to FIG. 5 can also be easily transferred to the sub-bodies 3, 4 according to FIGS. 2 through 4.

FIG. 6 shows a first embodiment of the container element 12 for the medium 2. The container element 12 is embodied in the form of a grid and has a sleeve-like three-dimensional form with a diameter D. The container element 12 can be inserted into one of the sub-cavities 5, 6 so that it is prestressed in the radial direction, i.e. with an external force exerted on it in the direction of its longitudinal axis, so that the diameter D is reduced. If the container element 12 is inserted into a sub-cavity 6 or cavity 7 during the production of the hollow body 1 according to the invention, then the prestressing functions as a force that holds the container element 12 in the sub-cavity 5, 6 or cavity 7. The container element 12 consequently holds the medium 2 and immobilizes it at a location in the sub-cavity 6 or cavity 7. During the production of the pressure-tight hollow body 1, this prevents the medium 2 from traveling into the region that is being joined or sealed. The container element 12 can, for example, be embodied in the form of a wire mesh composed of a metal wire or a plastic wire. Through the provision of the container element 12, the medium 2, which is in a solid or partially solid state, is kept spaced apart from an inner wall of the cavity 7 or sub-cavities 6, 5 so that an unintentional melting or partial melting at the inner wall, which is at the ambient temperature for example, is reliably prevented or kept within acceptable limits in the time until the integral joining has taken place. The container element 12 thus produces an insulating air cushion between the medium 2, which is in a solid or partially solid state, e.g. when the medium is composed of ice, so that the transmission of heat from the sub-body 3, 4 is prevented to a sufficient degree. This is also successfully achieved if the container element 12 is composed of a wire mesh made of a metal wire because contact points between such a container element 12 and the sub-bodies 3, 4 are small in area and consequently, only a slight transmission of heat can occur.

FIG. 7 shows another embodiment of the container element 12 for the use in a method according to the invention. The container element 12 in this case has an essentially rotationally elliptical three-dimensional form and forms a sort of grid cage around the medium 2. Individual arms protrude from the grid structure that likewise exert a holding force in a sub-cavity 5, 6 or cavity 7, which immobilizes the container element 12 and consequently the medium 2 in the sub-cavity 6 or cavity 7.

Since the medium 2 is in a liquid or gaseous state during the intended use of the hollow body 1, the container element 12 does not hinder the movement of the medium 2 from one end region 8 to the other end region 9 during the intended use. The container element 12 is advantageously composed of a material that does not melt at temperatures that occur during the intended use of the hollow body 1. Melting material could come into contact with the inner wall of the hollow body 1 and consequently hinder the transmission of heat to and from the medium 2. Alternatively, the container element 12 can be composed of a material that does in fact melt at temperatures that occur during the intended use of the hollow body 1, but nevertheless has a sufficiently high thermal conductivity that it does not hinder the transmission of heat between the hollow body 1 and the medium 2.

It can also be advantageous for the container element 12 to be composed of a material that melts at temperatures that occur during the intended use of the hollow body 1 or at temperatures that are higher than these temperatures and in the molten state, for example due to the swiveling or wobbling of the hollow body 1, comes to rest against the inner wall of the hollow body 1 and has anticorrosive properties accompanied by the best possible thermal conductivity. Such a material selection simply and successfully makes it possible to use a medium 2 that is corrosive to the material of the hollow body 1, without the occurrence of an undesirable corrosive attack on the material of the hollow body 1.

Figure 8:
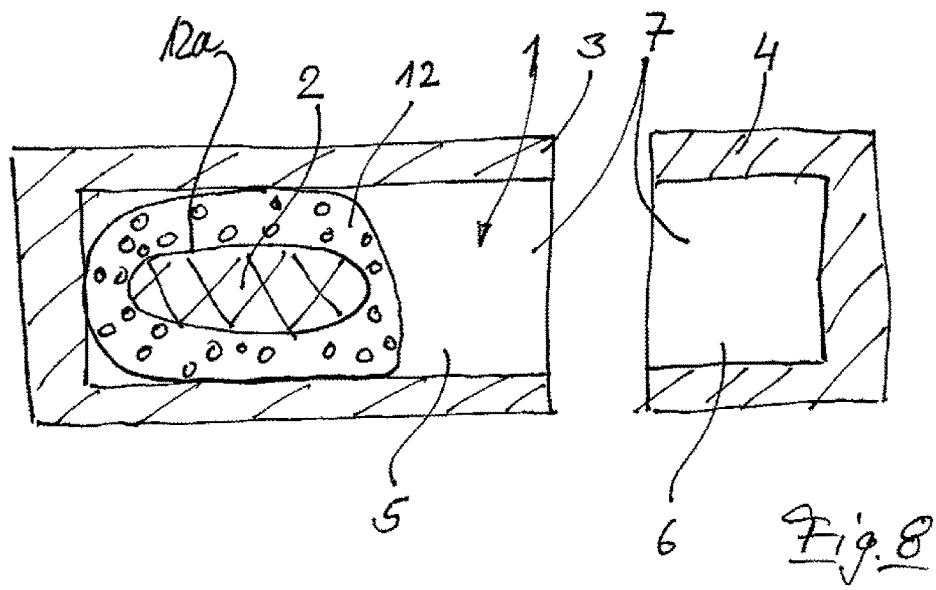
FIG. 8 schematically depicts a longitudinal section through sub-bodies with another embodiment of an inserted container element for the medium for use in the method according to the invention.

Another embodiment of a container element 12 that is suitable for use in the method according to the invention (FIG. 8) is composed, for example, of an open-pored, in particular foam-like material, into whose interior the medium 2 is introduced in a solid or partially solid state. By radially squeezing the open-pored material, it can be inserted into the interior of the sub-cavity of the sub-body 3 and clamps against its inner wall. In this case, the container element 12 composed of open-pored material acts as an insulator between the sub-body 3 and the medium 2 in a solid or partially solid state. The insulating action in this case is selected so that an integral joining method of the sub-bodies 3 and 4 can be carried out without the medium 2, which is in a solid or partially solid state, melting to an impermissible degree. After the sub-bodies 3, 4 have been integrally joined to each other, the medium 2 can, through heating, easily melt or transition into a gaseous state and escape through the open-pored structure of the container element 12 without absolutely requiring destruction of the container element 12 before the hollow body 1 is placed into operation.

So that the open-pored structure, which can for example be composed of a light-weight foam, does not hinder the heat transmission of heat from the sloshing or flowing liquid or gaseous medium 2 during operation of the hollow body 1, it is composed for example of a material that melts during operation or already melts at a temperature that is lower than the operating temperature of the hollow body 1 and comes to rest against at least a subregion of an inner wall of the cavity 1. As a result, the entire length of the inner cavity is free for a flowing or sloshing back and forth of the medium 2 in a liquid or gaseous state.

Figure 9:
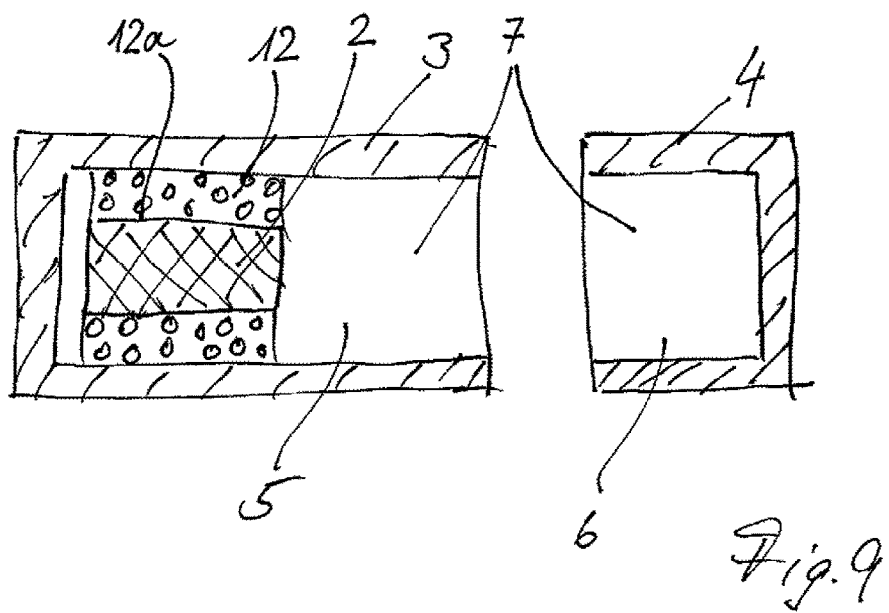
FIG. 9 schematically depicts a longitudinal section through sub-bodies with another embodiment of an inserted container element for the medium for use in the method according to the invention.

Another embodiment of the container element 12 that can be used for the method according to the invention is shown in FIG. 9. In this case, it is made of a closed-pored foam material, which is embodied in the form of a hose and encloses—in particular at least partially in the radial direction—the medium 2, which is in a solid or partially solid state, with the ends of the container element 12 being open. With such an embodiment of the container element 12, the container element 12 in any case provides a sufficient insulation of the solid or partially solid medium 2 relative to the sub-body 3 and on the other hand does not hinder—or constitutes a sufficiently slight hindrance to—the back and forth flow of the medium 2 or the back and forth sloshing of the medium 2 during operation of the hollow body 1 due to its design that is open in the longitudinal direction.

Alternatively to the porous embodiment of the container element 12 described in conjunction with FIG. 9, according to the invention, it can be made of an elastic material such as an elastic plastic of a nonporous type. Such a container element likewise has for example an inner region that is open at the end, into which the medium 2 can be introduced in a solid or partially solid state. In order to hold the container element 12 in a clamped fashion relative to the sub-body 1, it is possible for lips that extend in the radial direction for example or in the longitudinal direction to be molded onto it, which rest against the inside of the sub-body 3 in a prestressed fashion. Naturally, elastically deformable lugs on the outside are also a suitable option. The essential factor for this and the other embodiments of the container element 12 described here is for the container element 12 to be embodied so that it is able to hold the medium 2 in a solid or partially solid state and for it to be sufficiently insulated in relation to a wall of the sub-body 3 or of the body 10 at least for the duration of time until the integral sealing of the cavity 1 has taken place and for it to be embodied so that when the medium 2 is in the liquid or gaseous state, it is able to escape from the container element 12 and spread out in the cavity 7 of the hollow body 1.

Figure 10:
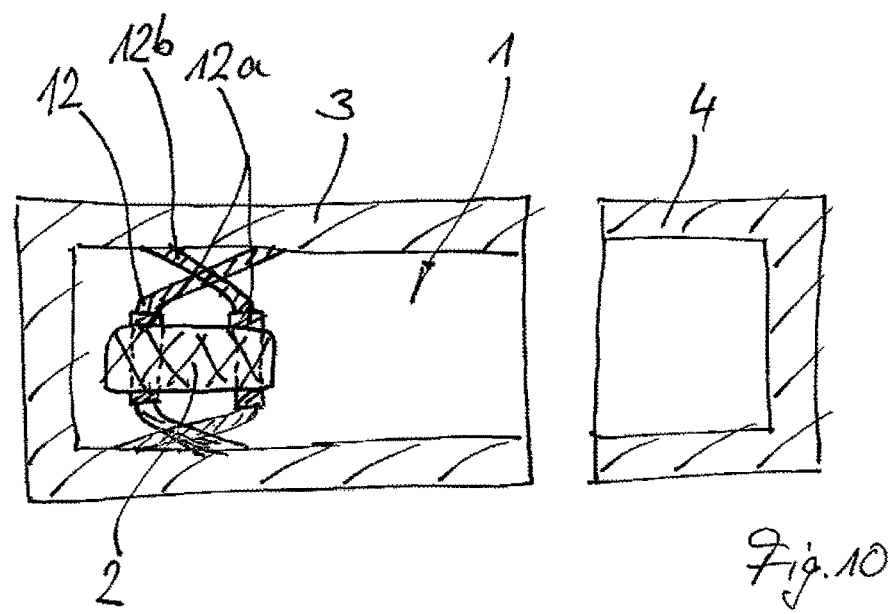
FIG. 10 schematically depicts a longitudinal section through sub-bodies with another embodiment of an inserted container element for the medium for use in the method according to the invention.
Figure 11:
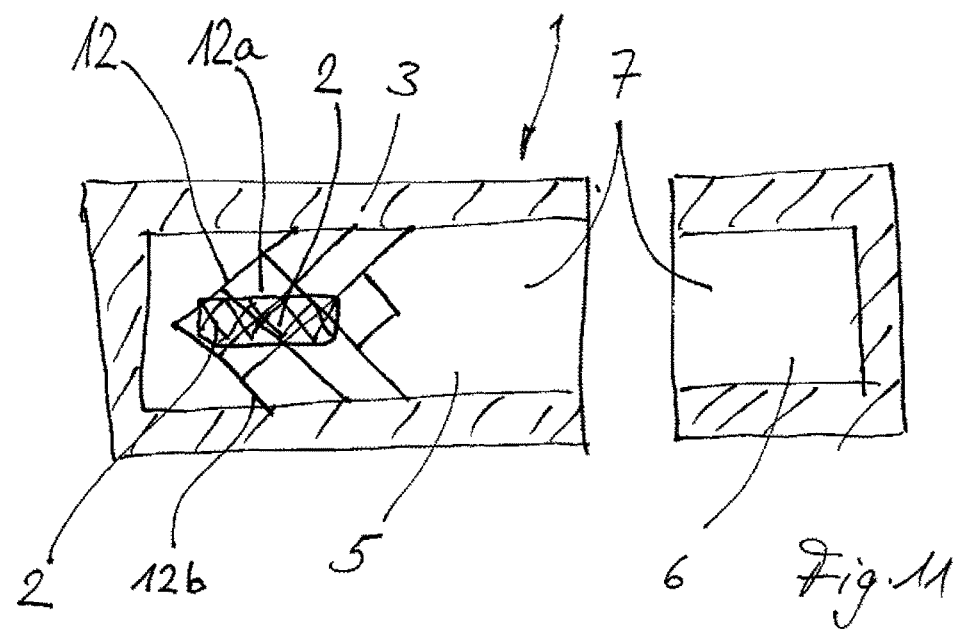
FIG. 11 schematically depicts a longitudinal section through sub-bodies with another embodiment of an inserted container element for the medium for use in the method according to the invention.

Other embodiments of the container element 12 are shown in FIGS. 10 and 11, which share the fact that the container elements have a holding zone for the medium 2 in a solid or partially solid state, by means of which it is possible to hold the medium 2, which is in a solid or partially solid state, so that it is in particular spaced apart from a wall of the sub-body 3. Because the container element 12 is provided with an essentially open design and/or a grid-like, net-like, or opening-equipped design that is permeable to the gaseous or liquid medium 2, the medium 2 in the liquid or gaseous state can easily escape from the holding zone of the container element 12. For example, the container element 12 has resilient arms by means of which the container element 12 can be accommodated in the sub-cavity 5 of the sub-body 3 in a clamped and/or hooked fashion.

Figure 12:
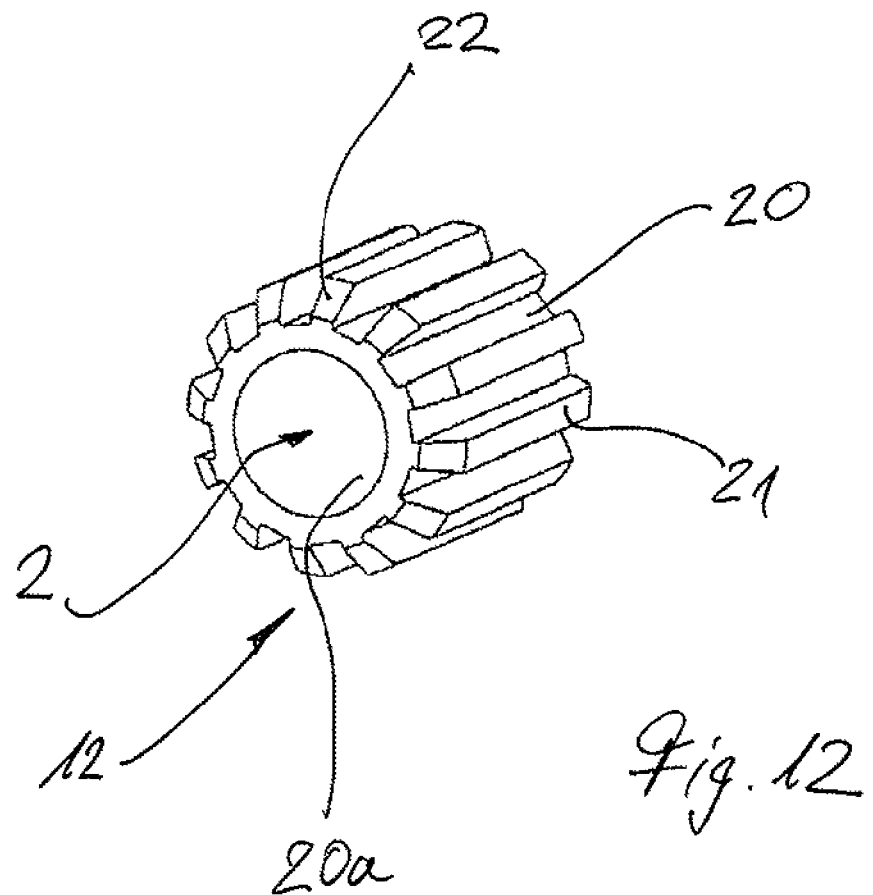
FIG. 12 schematically depicts a perspective view of another embodiment of a container element suitable for use in the method according to the invention.

Another embodiment of a container element 12 that can be used for the method according to the invention is shown in a perspective view in FIG. 12. For example, such a container element 12 has a cylindrical base body 20, which is equipped with a hollow interior 20a and is embodied to contain the medium 2 in a solid or partially solid state inside such an inner region 20a. Extending in the radial direction around the outside, a plurality of securing ribs 21 is provided, which extend essentially in the longitudinal direction of the cylindrical base body. At the ends, these securing ribs 21 have bevels 22 in order to facilitate insertion of the container element 12 into a sub-body 3 or 4. The securing ribs 21 in this case are preferably embodied as elastically deformable and/or plastically deformable and serve as means for immobilizing the container element 12 inside a sub-cavity 5 or 6. Naturally the securing ribs 21 can also be situated so that they extend in the radial direction around the inside of the base body 20. Preferably, the securing ribs 21 are embodied as elastically flexible relative to the base body 20 in order to be able to serve as resilient elements for clamping the container element 12 in the sub-body 3, 4 or in the body 10.

Figure 13A:
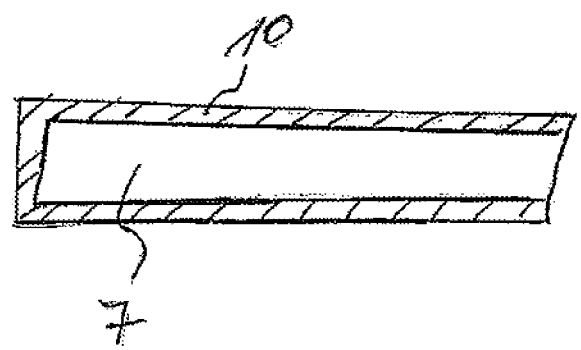
FIGS. 13A and 13B show the production of a hollow body according to one embodiment of the method according to the invention
Figure 13B:
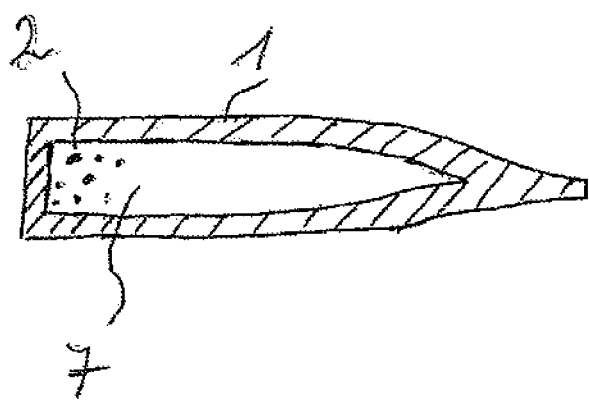

FIGS. 13a and 13b show an alternative of the method according to the invention for producing a pressure-tight hollow body 1. FIG. 13a shows a body 10 that is embodied as essentially tubular and is closed at one end. The body 10 consequently has a cavity 7. In the method according to the invention, the medium 2 is then introduced into the cavity 7 in a solid or partially solid state. Then the body 10 is integrally deformed at the open end. This deformation can, for example, be produced by heating this end and then compressing it. The hollow body 1 produced by this process thus has a cavity 7 with the medium 2 contained inside. The medium 2 cannot escape from the cavity 7, meaning that the hollow body 1 is pressure-tight.

In addition to the other embodiments described above, this embodiment is particularly suitable for an embodiment of the container element 12 out of a hard wax, paraffin, or similar wax-like materials.

The invention claimed is:

1. A method for producing a hollow body that is pressure-tight for a predetermined medium, comprising:
   introducing the medium into at least one sub-cavity of at least one sub-body in a solid or partially solid state together with a container element that contains or holds the medium in the solid or partially solid state, from which container element the medium can escape in a liquid or gaseous state, wherein the container element is composed or at least partially composed of at least one of the group consisting of:
      a material having open pores and is embodied with closed-pore surfaces or open-pore surfaces;
      a water-soluble material that is suitable for bonding to corrosive ingredients in the medium during operation; and
      a hard paraffin, wax, or a wax/graphite mixture; and
   then using an integral joining method at ambient pressure to integrally join at least two of the sub-bodies, which when joined form the hollow body that contains the medium in a gaseous and/or liquid state during an intended use of the hollow body.

2. The method according to claim 1, comprising using heat to integrally join the sub-bodies.

3. The method according to claim 1, comprising integrally joining the sub-bodies through deformation and/or the addition of material.

4. The method according to claim 1, comprising using friction welding or friction stir welding to achieve the integral joining.

5. The method according to claim 1, wherein the medium is water and/or a heat transfer fluid and/or perchloroethylene and/or trichloroethylene.

6. The method according to claim 1, wherein the container element is embodied in a grid-like or net-like or porous fashion and/or has a sleeve-like, spherical, cylindrical, or rotationally elliptical three-dimensional form.

7. The method according to claim 1, wherein the container element is composed of a material, which has open pores, and is embodied with closed-pored surfaces or open-pored surfaces.

8. The method according to claim 1, wherein the container element has a containing zone for containing the medium in a solid or partially solid state and has resilient elements with which the container element can be immobilized relative to an inside of the at least one sub-cavity in a clamped, hooked, or detent fashion, with the medium—which is in a solid or partially solid state—being spaced apart from a wall of the sub-body.

9. The method according to claim 1, wherein the container element is permeable to the medium in the liquid or gaseous state.

10. The method according to claim 1, wherein the container element is composed of a water-soluble material that is suitable for bonding to corrosive ingredients in the medium during operation.

11. The method according to claim 1, wherein the container element comprises cornstarch, sugar, sugar alcohols, or salts.

12. The method according to claim 1, wherein the container element is at least partially composed of a hard paraffin, wax, or a wax/graphite mixture.

13. The method according to claim 1, wherein the container element is composed of a material that is not medium-soluble and during operation, forms an emulsion with the medium.

14. The method according to claim 1, wherein, during operation, the material used for the container element melts and adheres in a layer to the inside of the at least one sub-cavity so that a corrosion protection is provided.

15. The method according to claim 1, wherein the container element has a clamping device or detent device, for holding the medium in a solid or partially solid state.

16. The method according to claim 1, wherein the container element has a tubular net structure as a containing zone for the medium in a solid or partially solid state and/or has resilient elements such as resilient arms that extend toward a wall of the sub-body.

17. The method according to claim 1, wherein a mass ratio of a mass of the container element relative to a mass of the medium is predetermined so that in an emulsion or a solution composed of the medium and the material of the container element that is produced during the intended use of the hollow body, a state of the solution or emulsion is achieved that is favorable for the intended operation with regard to a phase transition from the solid phase into the liquid phase and/or from the liquid phase into the gaseous phase.

* * * * *